United States Patent Office 2,786,323
Patented Mar. 26, 1957

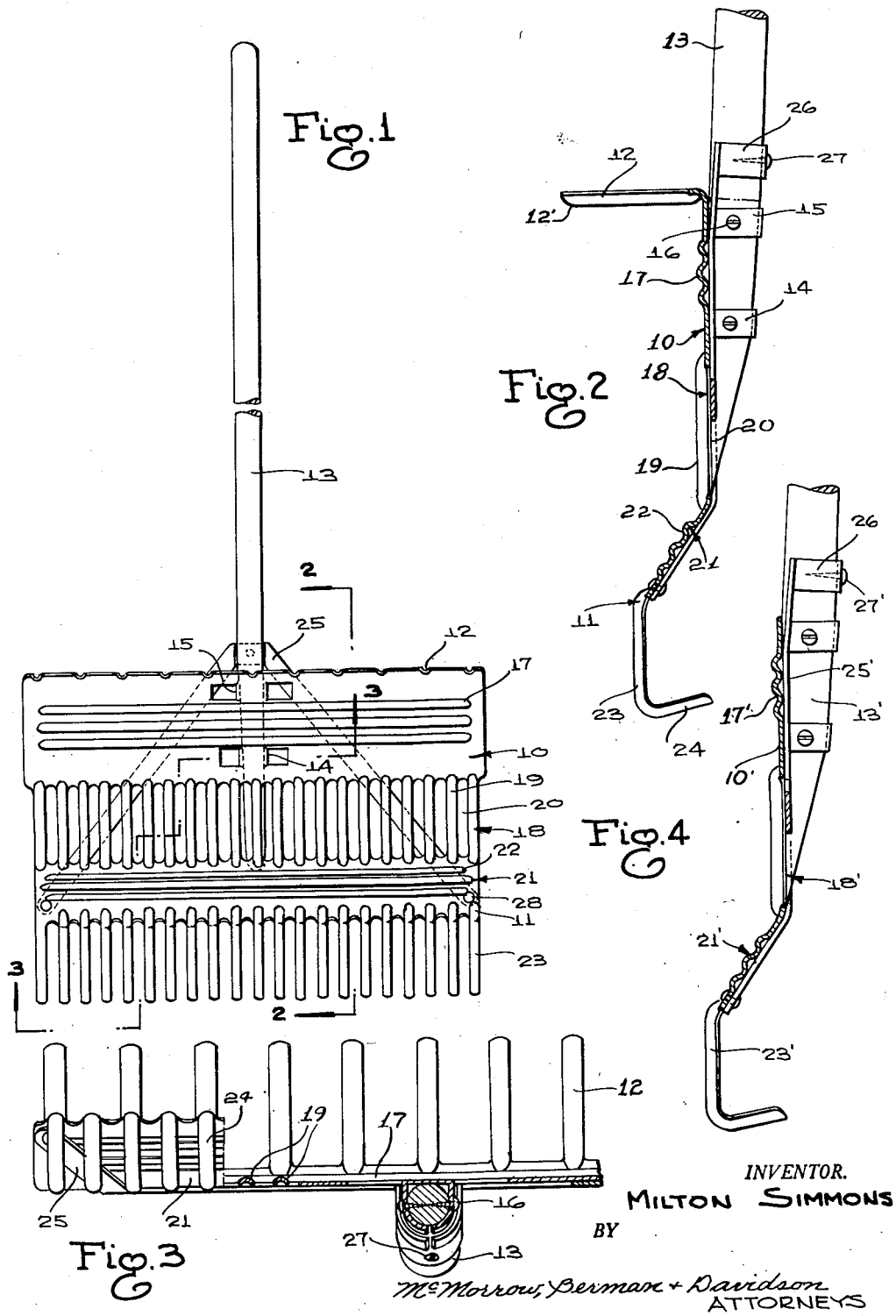

2,786,323

COMBINATION RAKE AND LEVELING DEVICE

Milton Simmons, Luray, Va.

Application October 22, 1954, Serial No. 463,942

3 Claims. (Cl. 56—400.05)

The present invention relates to rakes, and specifically to a rake having a leveling device attached for smoothing the ground as the tines of the rake enter the ground.

The primary object of the present invention is to provide a leveling device for attachment to a rake and integral therewith which will smooth the ground as the tines of the rake enter the ground for the purposes of preparing seed beds, raking leaves on soft ground and distribution of the loosened earth in a single operation.

Another object of the present invention is to provide a rake having a plurality of tines at each end of a section, the tines being engageable alternatively with the ground and in one manner of operation, the tines at one end forming smoothing devices, while the tines at the other end rake and penetrate the surface of the ground.

A further object of the present invention is to provide a rake in which the body member of the rake includes a plate section which may be used to sift material taken upon the back side or top side of the rake, using the rake between its tines as a shovel or carrier for leaves, dirt, or debris gathered by the tines of the rake.

A still further object of the present invention is to provide a rake which may be constructed of a single sheet of relatively stiff sheet metal, and formed on a cutting and forming die in one or two operations, and one which may be easily and readily attached to a handle by means of tabs or bosses which are struck from the sheet at the time of the forming operation.

These and other objects and advantages of the present invention will be fully apparent from the following description when taken in connection with the annexed drawings in which:

Figure 1 is a plan view of the rake of the present invention,

Figure 2 is an enlarged side view partially in cross section taken on line 2—2 of Figure 1, Figure 3 is an enlarged end view partially in cross section as on line 3—3 of Figure 1, and Figure 4 shows an alternative form of the rake of the present invention.

Referring in greater detail to the drawings in which like numerals indicate like parts throughout the several views, the invention is seen to consist of a body or sheet member 10, a rake 12 on one side of the member having free ends 12′ and projecting perpendicularly from one end of the member 10, a handle 13 on the other side of the member 10 and secured thereto, and a leveling device 11 on the other end of the body or sheet member 10 and extending longitudinally therefrom. The handle 13 has one end portion secured to the body member 10 by means of the upstruck stabs 14 and 15, which are arranged in pairs and bent downwardly, as seen in Figure 2. Screws 16 secure the tabs to the handle and the end of the handle is tapered to extend under a portion of the leveling device 11.

The body member 10 is further formed with upwardly bent reinforcing ribs 17 extending longitudinally thereof.

The leveling device 11 of the present invention includes a plate section 18 having ribs 19 extending transversely thereof and arranged in spaced relation with respect to each other with an opening 20 intermediate adjacent ribs 19.

The plate section 18 extends transversely with respect to the handle 13 and is disposed adjacent to the side of the body member 10 opposite the rake 12.

The leveling device further includes a reinforcing strip section 21 similar in appearance and having reinforcing ribs 22 extending longitudinally thereof and upstruck in the manner in which the ribs 17 are upstruck from the body member 10.

The reinforcing strip section 21 is attached to the plate section 18 on its side opposite from its place of attachment to the body member 10 and extends at an angle with respect to the plate section 18.

Next adjacent to and secured to the other side of the reinforcing strip section is an L-shaped tine section 23, the individual tines of which are arranged in spaced parallel relation with respect to each other and are connected by the ends of their long legs to the reinforcing strip section 21 on its side edge opposite to its edge which connects to the plate section 18. The short legs 24 of the L-shaped tine section 23 are arranged substantially parallel to the rake 12 and face toward the other side of the sheet member 10.

A V-shaped brace 25 is secured by its apex to the handle 13 by means of a semicircular section 26 which overlies the handle and is secured thereto by means of a nail 27. The legs of the V-shaped brace 25 extend to the outer edges of the leveling device 11 to where they are secured by a metal rivet, indicated by the reference numeral 28 in Figure 1.

In the alternative form of the present invention illustrated in Figure 4, a similar handle 13′ has a body member 10′ having longitudinally extending ribs 17′, the plate section 18′, the tine section 23′, and the reinforcing strip portion 21′, all of them formed similarly to the parts and the elements first named. The rake 12 is omitted from this embodiment, but a brace 25′ having the semicircular section 26′ and a similar nail 27′ is included.

In use, the rake 12 may be turned downwardly and used to penetrate the top surface of the ground, raking it and loosening the soil, while the tine section 23 follows or proceeds the backward and forward movements of the rake of the present invention over the ground, and the tine section smooths the ground as the rake 12 enters the ground and cuts it into fine furrows.

In another operation, the short legs 24 of the tine section 23, may be used as teeth to enter the ground, and having a shorter arc or angle of bend and a shorter length of tine, they may be used to disturb the surface of the soil to a greater depth and with more leverage. While in this position, the junction of the reinforcing strip section 21 with the reticulated plate section 18 also serves to smooth the ground, as in the preparation of a seed bed.

Another important feature of the invention is that, when the rake is reversed, the tine section 23 forms a scoop by which the gathered leaves or debris may be lifted up and carried.

Similarly, when the rake 12 is pointed downwardly, the space bounded by the tine section 23, the short legs 24, and the reinforcing strip section 21 also define a cup or cavity which may be used to enclose and lift stones, leaves, cut grass, or other material, for the purpose of disposing of same.

While only preferred embodiments of the invention have been shown and described, the embodiments of the present invention may be made and practiced and many changes and modifications may be made within the scope

What is claimed is:

1. A combination rake and leveling device comprising a sheet member, a rake on one side of said member having free ends and projecting perpendicularly from one end of said member, a handle on the other side of said member and secured to said member, and a leveling device on the other end of said sheet member and extending longitudinally therefrom, said device including a plurality of angularly disposed tines, each tine being L-shaped having a long leg disposed transversely of and substantially in alignment with the free ends of the rake and a short leg substantially parallel to said rake and facing toward the other side of said sheet member.

2. A combination rake and leveling device comprising a sheet member, a rake on one side of said member having free ends and projecting perpendicularly from one end of said member, a handle on the other side of said member and secured to said member, and a leveling device on the other end of said sheet member and extending longitudinally therefrom, said device including a plate section extending transversely with respect to said handle and secured to the lower end of said sheet member, and a plurality of angularly disposed tines dependingly carried by said plate section, each tine being L-shaped having a long leg disposed transversely of and substantially in alignment with the free ends of the rake and a short leg substantially parallel to said rake and facing toward the other side of said sheet member.

3. A combination rake and leveling device comprising a sheet member, a rake on one side of said member having free ends and projecting perpendicularly from one end of said member, a handle on the other side of said member and secured to said member, and a leveling device on the other end of said sheet member and extending longitudinally therefrom, said device including a plate section extending transversely with respect to said handle and secured to the lower end of said sheet member, a reinforcing strip section carried by said plate section, and a tine section dependingly carried by said strip section, said tine section having a plurality of angularly disposed tines, each tine being L-shaped having a long leg disposed transversely of and substantially in alignment with the free ends of the rake and a short leg substantially parallel to said rake and facing toward the other side of said sheet member.

References Cited in the file of this patent
UNITED STATES PATENTS

| | | |
|---|---|---|
| 1,773,208 | Taylor | Aug. 19, 1930 |
| 1,800,103 | Pihl | Apr. 7, 1931 |
| 2,307,448 | Bouton | Jan. 5, 1943 |
| 2,481,697 | Sharpe | Sept. 13, 1949 |